Figure 1:
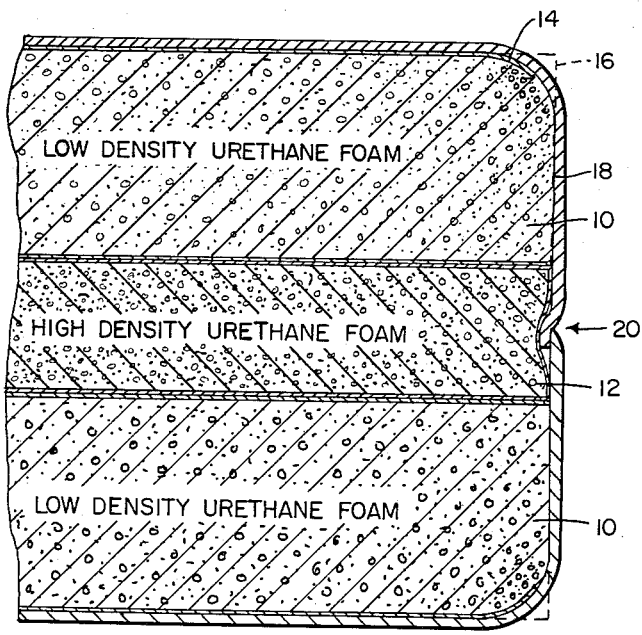

Jan. 21, 1964  B. G. HOOD  3,118,153
UPHOLSTERY CORNER CONSTRUCTION
Filed Oct. 21, 1960

INVENTORS
Bruce Gardner Hood
Ralph S. Hood
BY Porter, Chittick, Russell & Pfund
ATTORNEYS

United States Patent Office 3,118,153
Patented Jan. 21, 1964

3,118,153
UPHOLSTERY CORNER CONSTRUCTION
Bruce Gardner Hood, Marblehead Neck, Mass., assignor to Davidson Rubber Company, Inc., Dover, N.H., a corporation of New Hampshire
Filed Oct. 21, 1960, Ser. No. 64,126
1 Claim. (Cl. 5—345)

This invention relates to upholstery, and more particularly to the corner construction of an upholstered padded element employing low density polyurethane type foam material and covered with fabric, sheet film, or the like.

One of the problems presented in the use of foam rubber for upholstery elements has to do with the behavior of foam rubber when covered by a fabric or other similar sheet material. If the corner of the foam rubber padded element does not conform to the intended shape of the finished article, the material appears to stretch in some places and compact in others with the result that during periods of extended use the cushion shape gradually departs in contour from the originally desired shape. Accordingly the practise, over the years, of using foam rubber cushioning products has been to mold the foam rubber to the precise contour of the cushioning element in which the foam rubber is to be used. It will be understood, however, that molding cushioning elements with rounded or contoured corners is time consuming and expensive. Accordingly, it is a primary object of my invention to provide an upholstery combination in which the cushioning elements need not be molded to the desired contour of the end product, but may be fabricated with square corners and when compressed by the covering will conform thereto and remain in the desired shape of the covering throughout the normal life of the article.

In the accomplishment of this and other objects of my invention in a preferred embodiment thereof, I employ polyurethane foam materials in slab form and cut to the proper length. I laminate these materials together employing a low density foam for the top and bottom portions of the padded element and a relatively high denity foam core portion in between. A structure employing contour molded elements of this general texture is described in copending application Serial No. 33,217, filed June 1, 1960, entitled "Molded Foam Cushioning Element."

In this case, however, the cushion element comprises cut right angle corners of the foam material in combination with a covering which subjects the foam to compression and holds it in the desired shape. With this arrangement, the upholstery cover compresses the corner of the low density surface foam material and collapses it locally in the area of the corner. In this way the foam material assumes the desired shape of the corner and will remain substantially in this shape throughout the useful life of the upholstered element.

Figure 2:
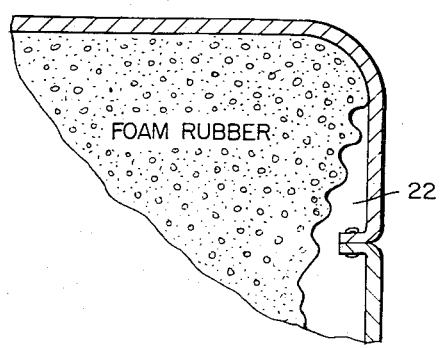

Further objects and features of my invention will best be understood and appreciated from a detailed description of a preferred embodiment thereof, selected for purposes of illustration, and shown in the accompanying drawings, in which:

FIG. 1 is a view in cross section of a cushion employing the corner construction of my invention; and FIG. 2 is a fragmentary view of a cover construction illustrating what happens when a square corner foam rubber cushioning element is covered and subjected to compression by an upholstery covering.

The preferred embodiment of my invention herein shown comprises a cushion such as might be used in a conventional easy chair or sofa. It will be understood, however, that the concept of the invention applies equally well to other upholstered elements such as pillows, arm rests, and the like.

In its construction, as seen in FIG. 1, the cushion element comprises a pair of low density polyurethane or the like foam sections 10 flanking a relatively high density foam core portion 12. The low density foam sections 10 have on their surfaces skin portions 14 which are imparted to the foam during the molding stage. The sections 10 are molded and cut initially with right angle corners as indicated in dotted lines at 16 in FIG. 1, and during fabrication of the upholstered element, the corners are compressed down to a rounded shape by means of an upholstery covering 18 which is joined by sewing, heat sealing, or the like at 20.

When the upholstery covering 18 is applied to the cushioning elements 10 and 12 as shown and stretched so as to compress the corner thereof, the polyurethane foam material initially resists this compression to a point, but as the compression is increased the resistance beyond that point does not increase and the material simply yields to the desired contour of the upholstery covering. This is especially true when these materials are backed up by a high density foam core portion as indicated at 12. The core portion 12 serves the purpose of holding the low density surface portions in general conformity with the longitudinal shape of the upholstered elements so that the compression and subsequent virtual collapse of the surface urethane foam takes place only at the corner where such is desired.

By way of contrast I have illustrated diagrammatically in FIG. 2 what happens when an upholstery covering is put over low density foam rubber and compressed around the corner thereof. When this happens the foam rubber surface stretches and the side face of the cushion becomes concave so that the foam rubber strongly resists assuming the new position imposed on it by the upholstery covering. Likewise a gap appears along the side face thereof as indicated at 22. In this case the urethane foam itself and particularly the skin portions 14, unlike foam rubber, strongly resist lateral stretching to a far greater degree than they resist downward compression. This also contributes to the general rounding off of the corner under the compression of the upholstery covering 18.

Since numerous minor modifications of this preferred embodiment of my invention will now be obvious to those skilled in the art, it is not intended to confine the invention to the precise form herein shown, but rather to limit it in terms of the appended claim.

Having thus described and disclosed a preferred embodiment of my invention, what I claim as new and desire to secure by Letters Patent of the United States is:

As a cushion, a laminated pad having the shape of a rectangular parallelepiped when unrestrained and consisting of top and bottom slabs of uniform thickness and a core of uniform thickness and coextensive with said top and bottom slabs so as to appear at the four edges of said laminated pad, and an upholstery covering surrounding said laminated pad, said top and bottom slabs being formed of a low density soft polyurethane foam the compression-deflection characteristics of which includes a condition in which said foam collapses upon the application of additional pressure, said core being formed of high density stiffer polyurethane foam and supporting and holding said top and bottom slabs in general conformity with the longitudinal shape of said cushion, and said upholstery covering being tensioned around the corner of said laminated pad sufficient to collapse said low density soft polyurethane foam locally at the corners thereof into a rounded shape.

References Cited in the file of this patent
UNITED STATES PATENTS

| | | |
|---|---|---|
| 2,831,532 | Kasper | Apr. 22, 1958 |
| 2,836,228 | Dahle | May 27, 1958 |